(No Model.)  
3 Sheets—Sheet 1.
W. THOMSON.
AZIMUTH INSTRUMENT.
No. 402,364.   Patented Apr. 30, 1889.
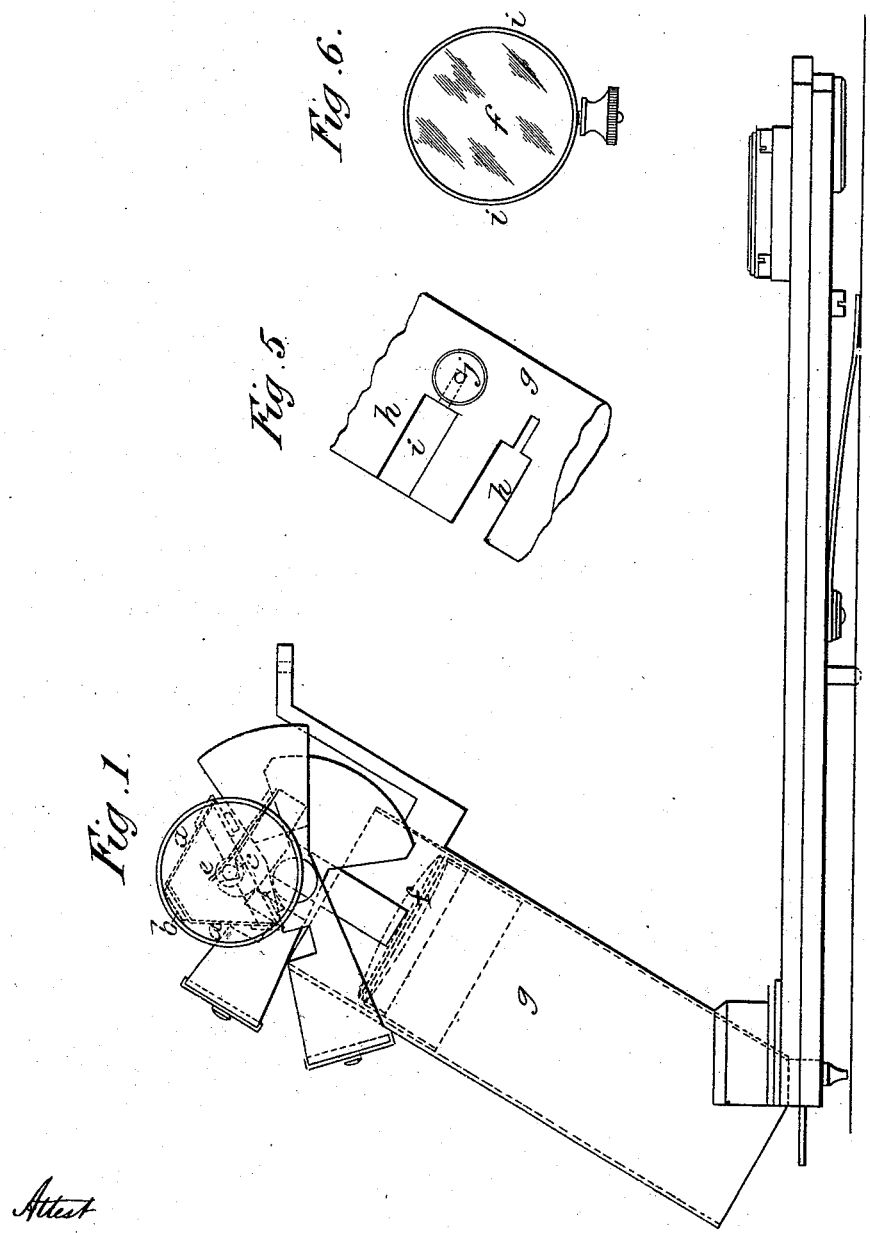

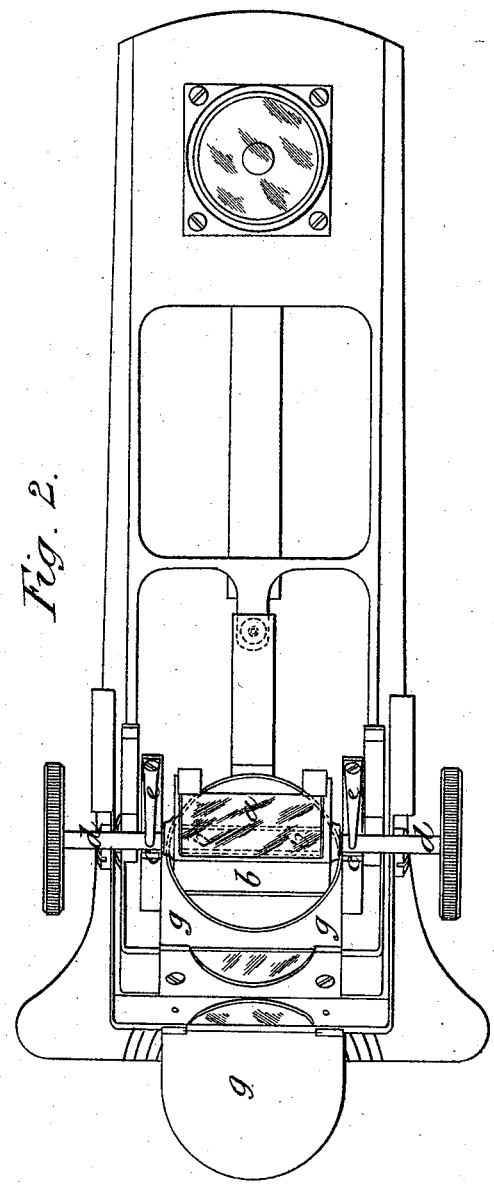

(No Model.) 3 Sheets—Sheet 3.
W. THOMSON.
AZIMUTH INSTRUMENT.
No. 402,364. Patented Apr. 30, 1889.
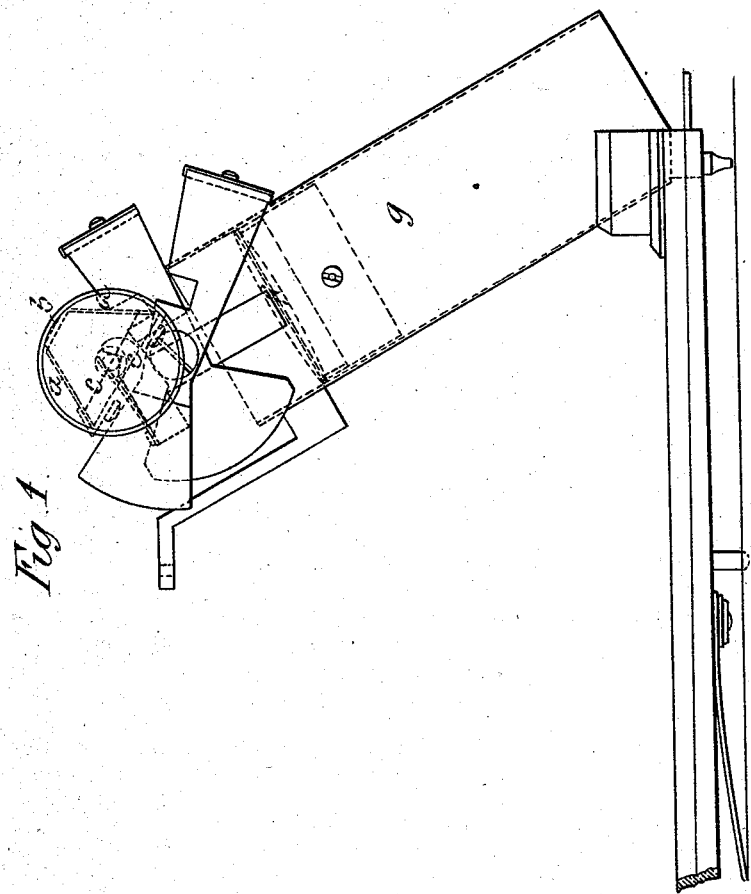
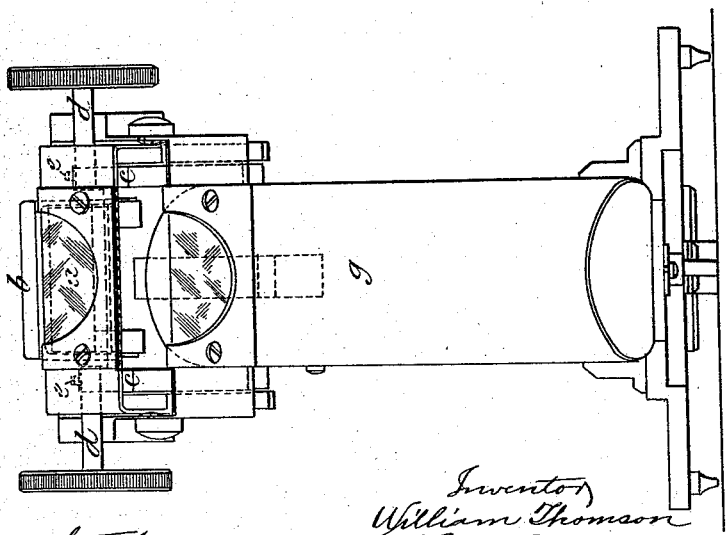
Attest
Edward Steer
F. A. Hopkins
Inventor
William Thomson
By Knight Bros.
Attys

UNITED STATES PATENT OFFICE.

WILLIAM THOMSON, OF GLASGOW, COUNTY OF LANARK, SCOTLAND.

AZIMUTH-INSTRUMENT.

SPECIFICATION forming part of Letters Patent No. 402,364, dated April 30, 1889.

Application filed November 5, 1885. Serial No. 181,936. (No model.) Patented in England December 8, 1883, No. 5,676.

*To all whom it may concern:*

Be it known that I, Sir WILLIAM THOMSON, knight, of Glasgow college, doctor of laws and professor of natural philosophy in the university and college of Glasgow, in the county of Lanark, North Britain, have invented an Improved Apparatus for Taking Azimuths, of which the following is a specification.

My invention is embodied in English Patent No. 5,676, dated December 8, 1883, and is an improvement on the apparatus for taking azimuths shown, described, and claimed by me in Letters Patent No. 210,068, dated November 19, 1878.

My improvement consists, first, in the substitution of a rotating totally-reflecting prism for the ordinary mirror. The advantage of the prism over an ordinary mirror is that in the azimuth-instrument where mirrors are employed it has been found that when exposed to much wet or damp the silvering of the mirror comes off. This defect is entirely done away with when the prism is employed. The prism is mounted in such a manner as to be able to turn round on a horizontal axis, so that bearings can be taken either by reflecting the object in the prism and looking direct through the lens at the degrees of the compass-card or by reflecting the degrees of the card in the prism and looking over the prism at the object the bearing of which is required.

My improvement consists, secondly, in the provision of an eccentric lens to facilitate the adjustment of the instrument.

My improvement consists, thirdly, in constructing the tube so as to be able to use two or more lenses of different focal length, one for taking bearings of objects on the horizon and the others for taking bearings of the sun and stars at different altitudes.

In order that my invention may be fully understood, I will proceed to describe it with reference to the accompanying drawings, in which—

Figure 1 is a side elevation of my improved azimuth-mirror. Fig. 2 is a plan view thereof. Fig. 3 is an end elevation. Fig. 4 is a side elevation looking in the opposite direction to that shown in Fig. 1. Fig. 5 is a side elevation of a part of the tube. Fig. 6 is a plan view of the lens detached.

Referring to Figs. 1, 2, 3, and 4, I show my improved azimuth-mirror provided with a supporting-frame, inclined tube $g$, and movable pieces similar to that shown in my Letters Patent, No. 210,068, heretofore referred to.

$a$ is a totally-reflecting prism substituted for the ordinary mirror proper, such as shown in said Letters Patent. This prism $a$ is mounted in the frame $b$, which is supported by the bearings $c$, secured to the body of the instrument.

The shaft $d$, to which the frame $b$ is connected, is pressed into its bearings by means of the springs $e$. This construction of the instrument admits of the prism $a$ being turned round a horizontal axis, so that bearings can be taken either by reflecting the object in the prism and looking direct through the lens $f$ (represented in dotted lines in Figs. 1 and 4) at the degrees of the compass-card or by reflecting the degrees of the card in the prism $a$ and looking over the said prism at the object the bearing of which is required. The lens $f$ is eccentric to facilitate the adjustment of the instrument. By the word "eccentric" it is to be understood that the center of the lens is not concentric with that of the tube $g$ containing the said lens.

Referring to Figs. 5 and 6 it will be seen that the tube $g$ is constructed so as to admit of the use of two or more lenses of different focal length. The tube is formed with the openings $h$ for the reception of the lenses $f$, one of which is shown in position within the tube. The lenses $f$ are mounted in the frames $i$, which are provided with binding-screws $j$ for securing the lenses within the tube when in their proper position. The upper one of the openings $h$ is used for the lens $f$, when the bearings of the sun or stars or other objects at high altitudes are required, and the lower one is used for a similar lens of shorter focal length when the bearings of objects on the horizon are required.

In using the azimuth-mirror the instrument is placed in position on the compass with one foot resting in the hollow in the center of the glass and the other two feet resting on the glass. The observer when taking a bearing turns the instrument round its vertical axis until the mirror and lens are fairly opposite to the object. He then looks through the lens at the degree-divisions of the compass-card and turns the mirror round its horizontal axis till he brings the image of the object to fall on the card. He then reads directly on the card the compass-bearing of the object. For taking bearings of distant land-marks, which are too indistinct to be seen when reflected in the prism, the observer turns the instrument toward the object, then places his eye so as to see the object over the prism, and turns the prism round until he sees the degrees of the compass-card reflected in it. He then reads from the card the compass-bearing of the object seen over the prism.

Having thus described my invention, the following is what I claim as new therein and desire to secure by Letters Patent:

1. An azimuth-mirror having one or more eccentrically-mounted lenses, substantially as described.

2. An azimuth-mirror having a tube, $g$, formed with slot or slots and provided with one or more lenses, substantially as described.

3. An azimuth-mirror having a totally-reflecting prism, $a$, and one or more lenses, substantially as described.

4. An azimuth-mirror having a tube, $g$, formed with slot or slots, provided with one or more eccentrically-mounted lenses and a totally-reflecting prism, substantially as described.

In testimony whereof I have signed my name to this specification in the presence of two subscribing witnesses.

WILLIAM THOMSON.

Witnesses:
  ROBERT ADAM GUNN,
  JOHN MADDER FREDHOPE,
  *Both of 115 St. Vincent Street, Glasow.*